United States Patent Office 3,442,949
Patented May 6, 1969

3,442,949
METHOD FOR PREPARING 5-(3-AMINOPROPYL-IDENE)-5H-DIBENZO - [a,d] - 10,11 - DIHYDRO-CYCLOHEPTENES
Norman L. Wendler, Summit, N.J., assignor to Merck & Co., Inc., Rahway, N.J., a corporation of New Jersey
No Drawing. Original application May 3, 1965, Ser. No. 452,929. Divided and this application Aug. 16, 1967, Ser. No. 668,276
Int. Cl. C07c *85/08, 85/00*
U.S. Cl. 260—570.8         5 Claims

ABSTRACT OF THE DISCLOSURE

Dibenzocycloheptenes having antidepressant activity are prepared in accordance with a process which includes epoxidizing 5-allylidene-5H-dibenzo[a,d] - 10,11-dihydrocycloheptene or a 3-loweralkyl-sulphonyl or a 3-trifluoromethyl derivative, by reaction with a peracid; rearranging the epoxidized allylidene to the corresponding 5-(oxapropylidene) derivative; and finally performing a reductive amination on the latter compound to produce the corresponding 5-(dimethylamino-propylidene) or 5-(methylaminopropylidene) derivative.

---

This is a division of application Ser. No. 452,929, filed May 3, 1965.

This invention relates to the preparation of derivatives of dibenzocycloheptenes. In particular the invention relates to the preparation of 5H-dibenzo [a,d]-10,11-dihydrocycloheptenes and nuclear substituted derivatives thereof which are substituted at the 5-position with a methylaminopropylidene or a dimethylaminopropylidene radical. The invention also relates to intermediates which are useful in the synthesis of the above-mentioned compounds.

The end products of the present invention are useful in the treatment of mental health conditions as they are antidepressants and serve as mood elevators and psychic energizers.

The process provided by the present invention comprises epoxidizing a 5-allylidene-5H-dibenzo[a,d]-10,11-dihydrocycloheptene derivative by reacting it with a peracid, rearranging the epoxidized allylidene to the corresponding 5-(oxapropylidene) derivative and finally performing a reductive amination on the latter compound to produce the corresponding 5-(dimethylaminpropylidene) or 5-(methylaminopropylidene) derivatives, depending on the particular aminating agent used.

While the process is particularly suitable for the preparation of 5-(3-dimethylaminopropylidene)-5H-dibenzo [a,d]-10,11-dihydrocycloheptene and 5-(3-methyl-aminopropylidene) - 5H-dibenzo[a,d]-10,11 - dihydrocycloheptene, it may be used with equal facility for the preparation of the above-mentioned compounds which may be substituted in the benzene moieties with one or more substituents from the appropriately substituted allylidenes providing such substituents will not react with the reagents utilized in the process. Thus, for example, the process may be used to prepare 5-(3-dimethylaminopropylidene)- 5H-dibenzo[a,d]-10,11 - dihydrocycloheptenes and 5-(3-methylaminopropylidene) - 5H-dibenzo [a,d]-10,11-dihydrocycloheptenes which are substituted in benzene moieties with one or more groups such as perfluoroloweralkyl and loweralkylsulfonyl.

Representative compounds which may be prepared in accordance with this invention include:

(1) 5 - (3-dimethylaminopropylidene)-3-methyl-sulfonyl-5H-dibenzo[a,d]-10,11-dihydrocycloheptene, (2) 5 - (3-dimethylaminopropylidene)-3-trifluoromethyl-5H-dibenzo[a,d]-10,11-dihydrocycloheptene, (3) 5 - (3-methylaminopropylidene) - 3-methylsulfonyl-5H-dibenzo,[a,d]-10,11-dihydrocycloheptene, and (4) 5 - (3-methlaminopropylidene)-3-trifluoromethyl-5H-dibenzo[a,d]-10,11-dihydrocycloheptene.

For purposes of illustration, the preparation of the compounds 5-(3-dimethylaminopropylidene)-5H-dibenzo-10,11-dihydrocycloheptene and 5-(3-methylaminopropylidene)-5H-dibenzo[a,d]-10,11-dihydrocycloheptene from the appropriate 5-allylidene-5H-dibenzo[a,d]-10,11-dihydrocycloheptene may be represented structurally as follows:

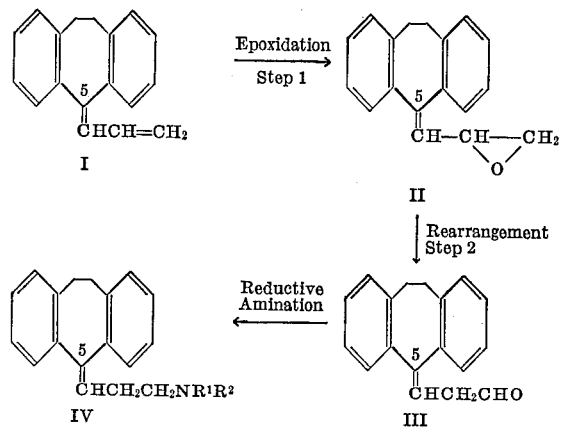

wherein $R^1$ and $R^2$ are selected from the group consisting of hydrogen and methyl.

However, as previously indicated, the above illustrated process may also be utilized for the preparation of those 5H - dibenzo[a,d]-10,11-dihydrocycloheptenes containing one or more nuclear substituents by employing an appropriately substituted 5-allylidene-5H-dibenzo[a,d]-10, 11-dihydrocycloheptene in place of the unsubstituted 5-allylidene.

As illustrated by the above reaction scheme, the first step of the process involves an epoxidation of the 5-allylidene-5H[a,d]-10,11-dihydrocycloheptene. Thus, this step of the invention is performed by intimately contacting the 5 - allylidene-5H-dibenzo[a,d]-10,11-dihydrocycloheptene with approximately molar amounts of a peracid such as, for example, peracetic acid, perbenzoic acid, peroxytrifluoroacetic acid, perphthalic acid and the like, in an inert organic solvent such as, for example, benzene and toluene. The reaction described above is generally carried out at room temperature or below, since a selective epoxidation may not take place at higher temperatures. When the reaction is complete, as determined for example, by the disappearance of the diene absorption in the U.V. band, the epoxidized product can be recovered by evaporating the solvent after the solution of the reaction product has been washed with a basic solution such as, for example, 5% aqueous sodium carbonate solution to remove any excess peracid.

The second step of the reaction sequence, namely, the rearrangement of the epoxidized 5-allylidene derivative (II) to the corresponding 5-(3-oxapropylidene) derivative (III) is accomplished by treating the epoxidized 5-allylidene derivative with an acid catalyst such as boron trifluoride etherate, zinc chloride and halogen acids in an appropriate inert organic solvent such as benzene, dioxane or tetrahydrofuran. Generally, the rearrangement reaction is performed at a temperature of 50° C. or lower; however, it is preferable to run the rearrangement reaction at room temperature or below. The 5-(3-oxapropylidene) derivative obtained can be isolated by washing the solution free of any acid catalyst with water and then evaporating the solvent. Purification can be effected by way of the bisulfite addition product or chromatography.

The third step of the invention comprises a reductive amination of the 5-(3-oxapropylidene) derivave. The reductive amination can be performed by reacting the 5-(3-oxapropylidene) derivative with dimethylamine or monomethylamine in an organic solvent to produce the corresponding dieneamine and then hydrogenating the solution of the dieneamine to produce the desired product. Preferably, the 5-(3-oxapropylidene) derivative and the appropriate amine are refluxed in a water-immiscible solvent such as benzene, toluene and the like for a period of approximately 4–10 hours while water is azeotroped from the reaction mixture. The hydrogenation of the dieneamine solution is then accomplished by reacting the said solution with hydrogen at atmospheric pressure in the presence of a hydrogenation catalyst such as palladium on carbon, Raney nickel and the like. The temperature at which the hydrogenation is carried out is not critical although it is preferable to carry out the hydrogenation at room temperature.

Alternatively, the reductive amination can also be performed by dissolving the 5-(3-oxapropylidene) derivative (III) in an alcohol such as ethyl alcohol, adding the appropriate amine to the solution and immediately subjecting the resulting solution to a similar hydrogenation as explained above.

When the uptake of the hydrogen is completed, the desired product can be isolated by evaporating the solvent under reduced pressure. The desired product is usually used commercially as the hydrochloride salt and it can be isolated as such by passing hydrogen chloride gas through an ether solution of the free base.

The starting materials of the present invention, namely the 5-allylidene derivatives, can be prepared by reacting a 5H-dibenzo[a,d]-10,11-dihydrocycloheptene-5-one with an allyl magnesium halide Grignard reagent, hydrolyzing the resulting adduct to form the corresponding 5-allyl-5-hydroxy derivative and then dehydrating the carbinol to form the desired 5-allylidene derivative. A procedure for the preparation of the substituted 5H-dibenzo[a,d]-10,11-dihydrocycloheptene-5-ones is shown in the first two examples.

Following are various examples which illustrate the invention. They are intended as illustrations of the invention and not as limitations.

EXAMPLE 1

3-methylsulfonyl-5H-dibenzo[a,d]-10,11-dihydro-cyclohepten-5-one (A) Preparation of cuprous methylmercaptide.—Concentrated ammonium hydroxide solution, 300 ml., is placed in a 1 liter, 3-necked flask fitted with a stirrer and gas inlet tube. The apparatus is cooled in an ice-bath and flushed with dry nitrogen while 40.0 g. (0.40 mole) of cuprous chloride is added portionwise with stirring. To the dark blue solution is added 95% ethanol, 300 ml., and then methylmercaptan is bubbled into the cooled solution until precipitation is complete and the supernatant solution becomes yellow. The solid is collected and washed by centrifugation with four portions of dilute ammonium hydroxide solution, followed by four portions of absolute ethanol. The yellow product is dried under reduced pressure at 45–50° C. and finally in a vacuum desiccator over concentrated sulfuric acid. The yield of product is 41.4 g. (93%).

(B) Preparation of 3-methylmercapto-5H-dibenzo[a,d] - 10,11 - dihydrocyclohepten - 5 - one.—3 - bromo-5H-dibenzo[a,d]-10,11-dihydrocyclohepten-5-one, 7.93 g., and cuprous methylmercaptide, 4.01 g. (0.036 mole), prepared as described in step (A), are put in a 100 ml. flask fitted with a stirrer and reflux condenser. Quinoline, 44.8 ml. and pyridine, 4.0 ml. are added and the slurry is heated at 200° C. with stirring for six hours. The reaction mixture is poured into 6 N hydrochloric acid, 120 ml., and ice and extracted with five 150 ml. portions of boiling benzene. The combined extracts are washed with three 200 ml. portions of 3 N hydrochloric acid. After washing with water the solvent is evaporated under reduced pressure, leaving a brown oil, weight 7.41 g., as residue. The oil is dissolved in absolute methanol, 125 ml., and boiled with 370 mg. decolorizing carbon for thirty minutes. The filtrate is concentrated to 60 ml. and a yellow solid separates, along with a brown oil. The solid is mechanically separated from the oil and dried in a vacuum desiccator over concentrated sulfuric acid. The product which weighs 2.77 g. is evaporatively distilled at 146° C./0.1 mm. and the sublimate is crystallized from 25 ml. of absolute methanol to give 2.65 g. of material.

(C) Preparation of 3 - methylsulfonyl - 5H - dibenzo [a,d] - 10,11 - dihydrocyclohepten - 5 - one.—3 - methylmercapto - 5H - dibenzo[a,d] - 10,11 - dihydrocycloheptan-5-one (10.70 g.) is dissolved in 35 ml. of glacial acetic acid. Hydrogen peroxide (30%, 15 ml.) is added and the solution is stirred at room temperature for 65 hours. The white solid that precipitates is collected and dried to yield 10.81 g. (91%) of product.

EXAMPLE 2

3-trifluoromethyl-5H-dibenzo[a,d]-10,11-dihydro-cyclohepten-5-one (A) p-Trifluoromethyltoluene.—p-Trifluoromethylbenzyl alcohol (82.25 g., 0.467 mole) is dissolved in 165 ml. of glacial acetic acid, 1.78 g. of palladium monoxide catalyst is added and the mixture is hydrogenated at 25° C. and 40 p.s.i. After separating the catalyst, the filtrate is added dropwise to a stirred solution of 346 ml. of 10 N potassium hydroxide maintained below 10° C. by cooling in an ice-salt mixture. The product is extracted with three 40 ml. portions of petroleum ether (B.P. 30–40° C.). The combined extracts are washed with water, dried over anhydrous sodium sulfate, and then distilled through a spinning band distilling column. The product boils at 129–130° C., $n_D^{24.5}$ 1.4276, and weighs 61.42 g. (82%). A center-cut is analyzed.

(B) 5-trifluoromethyl-o-toluidine.—p-Trifluoromethyltoluene (47.62 g., 0.298 mole) is dissolved in 96 ml. of concentrated sulfuric acid and treated with a solution of concentrated nitric acid (70–71%) (29.6 g., 0.328 mole) in 61.8 g. of concentrated sulfuric acid that is added dropwise over forty minutes with stirring and cooling in an ice-bath. The mixture then is stirred in the ice-bath for thirty minutes, slowly allowed to warm to 23 to 26° C., and stirred at 23–26° C. for twenty-one hours. The reaction mixture is poured carefully into 350 ml. of ice and water and extracted with three 200 ml. portions of methylene chloride. The combined extracts are washed twice with 200 ml. portions of water, three times with saturated sodium bicarbonate solution and three times with 300 ml. portions of water. After drying over anhydrous sodium sulfate, the solvent is distilled at atmospheric pressure. The orange liquid residue is dissolved in 290 ml. of glacial acetic acid and hydrogenated at 25° C. and 50 p.s.i. over 4.4 g. of 5% platinum-on-carbon catalyst. The catalyst then is separated, the solution treated with 36.5 ml. of 10.2 N ethanolic hydrogen chloride solution (0.372 mole, 25% excess) and evaporated under reduced pressure on the steam-bath. The tan solid residue is recrystallized from isopropyl alcohol, yielding 41.96 g. of product melting at 249.5–253.5° C. (due to sublimation, it is necessary to determine melting points in sealed capillary tubes). Concentration of the mother liquors yields an additional 10.96 g. of product melting at 248.5–251° C. (overall yield is 84%). An analytical sample from another experiment melts at 249–251.5° C. after recrystallization from isopropyl alcohol.

(C) 2-iodo-4-trifluoromethyltoluene.—A suspension of 5-trifluoromethyl-o-toluidine hydrochloride (67.73 g., 0.32 mole) in 810 ml. of water and 122 ml. of concentrated hydrochloric acid is cooled to −3° C. in an ice-salt bath. A solution of 22.35 g. of sodium nitrite in 81 ml. of water is added below the liquid surface over twenty minutes with stirring. The orange solution is stirred in the ice-salt bath for one hour and then is treated with a solution of 81 g. of potassium iodide in 240 ml. of water. Considerable gas evolution occurs and a brown precipitate separates. The mixture is stirred in an ice-salt bath for one hour and then heated on a steam-bath for two hours. After discharging the iodine color with 20% sodium bisulfite solution, the mixture is steam-distilled, collecting approximately four liters of distillate. The product is extracted with four 800 ml. portions of methylene chloride. The combined extracts are dried over anhydrous sodium sulfate and the solvent is distilled at atmospheric pressure. The red liquid residue is distilled under reduced pressure and the product, boiling at 66° C./4.8 mm., weighs 67.74 g. (74%). An analytical sample from another experiment boils at 64–65° C./4.8 mm.; $n_D^{25}$ 1.5226.

(D) 5-trifluoromethyl-o-toluic acid.—Magnesium turnings (27.7 g., 1.14 g. atoms), a crystal of iodine, 2.5 ml. of bromoethane and 20 ml. of tetrahydrofuran are treated with 3 ml. of a solution of 32.69 g. (0.114 mole) of 2-iodo-4-trifluoromethyltoluene in 130 ml. of tetrahydrofuran. The mixture is stirred slowly at room temperature for approximately five minutes to initiate the reaction. The remainder of the iodo-compound is added over thirty minutes at such a rate that gentle refluxing is maintained. The mixture then is refluxed on a steam-bath for 90 minutes with stirring, cooled in an ice-bath to −5° C. and dry carbon dioxide is bubbled into the mixture of 2.5 hours, maintaining the temperature below 5° C. With continued cooling, the mixture is hydrolyzed by the dropwise addition of 133 ml. of 6 N hydrochloric acid. Unreacted magnesium is separated by filtration, the filtrate is extracted with three 400 ml. portions of ether, and the combined extracts then are extracted three times with 200 ml. portions of 5% sodium hydroxide. The combined alkaline extracts are warmed on a steam-bath for 90 minutes while passing a stream of nitrogen over the solution to remove ether. The turbid solution is filtered, and the clear yellow filtrate is acidified with 3 N hydrochloric acid. The white solid is collected, washed by suspension in water and dried in a vacuum desiccator, first over concentrated sulfuric acid and, finally, over phosphorous pentoxide. The yield of product melting at 123–124.5° C. is 16.15 g. (69%). An analytical sample from another experiment melts at 123.5–125° C. after sublimation at 105° C. and 40 mm.

(E) 5-trifluoromethyl-phthalaldehydic acid.—5-trifluoromethyl-o-toluic acid (20.53 g., 0.10 mole) is dissolved in 300 ml. of thionyl chloride and the solution is refluxed for one hour. The excess thionyl chloride is distilled under reduced pressure below 40° C. The brown liquid residue is dissolved in 510 ml. of carbon tetrachloride, N-bromosuccinimide (37.38 g., 0.21 mole) is added and the mixture is stirred and refluxed for forty-one hours under ultraviolet irradiation. Succinimide is removed by filtration and the filtrate is distilled under reduced pressure at 45–50° C. to remove carbon tetrachloride. The red oily residue is dissolved in 150 ml. of anhydrous ether and the solution is added dropwise with stirring to 400 ml. of 1.016 N methanolic sodium methoxide solution while cooling in a solid carbon dioxide-acetone mixture. A precipitate separates immediately and the mixture is stirred at room temperature for ten hours. The ether is distilled and the mixture then is refluxed for 1½ hours. Water, 250 ml., is added and refluxing is continued for two hours followed by the addition of 104 ml. of 6 N hydrochloric acid and an additional hour of refluxing. Methanol is distilled under reduced pressure and the residue is distributed between 225 ml. of methylene chloride and 200 ml. of water. The aqueous layer is separated and again extracted with methylene chloride. The combined methylene chloride extracts are washed once with water, then extracted three times with 250 ml. portions of saturated sodium bicarbonate solution and washed three times with water. The combined bicarbonate extracts and washings are acidified with 6 N hydrochloric acid and extracted with three 250 ml. portions of methylene chloride. After washing with water, the combined methylene chloride extracts are extracted three times with 200 ml. portions of 20% sodium bisulfite solution. The combined bisulfite extracts are acidified with 180 ml. of concentrated hydrochloric acid and then evaporated under reduced pressure on the steam bath. The yellow solid residue is suspended in 500 ml. of 6 N hydrochloric acid and refluxed for 2½ hours with stirring. The reaction mixture is poured into 300 ml. of water, extracted three times with benzene and the combined extracts are washed with water. After drying over anhydrous magnesium sulfate, the benzene is evaporated under reduced pressure leaving a pale yellow solid as residue. The product weighs 6.66 g. (31%) and melts at 112.5–114.5° C. An analytical sample melts at 114–115° C. after recrystallization from water.

(F) 2-phenethyl-5-trifluoromethylbenzoic acid.—Magnesium turnings (0.96 g., 0.0396 g. atom) and a crystal of iodine are covered with 4 ml. of anhydrous ether and to the mixture is added 2 ml. of a solution of 5.01 g. (0.0396 mole) of benzyl chloride in 20 ml. of anhydrous ether. The reaction begins immediately and the remainder of the benzyl chloride solution is added dropwise over thirty minutes, occasionally moderating the reaction by cooling in an ice bath when refluxing becomes vigorous. The mixture is refluxed on a steam bath for thirty minutes, and the solution of benzylmagnesium chloride then is transferred to a dropping funnel with nitrogen pressure. The Grignard reagent is added dropwise over thirty minutes to a stirred solution of 2.17 g. (0.0099 mole) of 5-trifluoromethyl-phthalaldehydic acid in 24 ml. of dry tetrahydrofuran while cooling in an ice bath. The red solution is stirred at room temperature for one hour, then cooled in an ice bath and the Grignard adduct is hydrolyzed by the dropwise addition of 10 ml. of 6 N hydrochloric acid. The solvent is evaporated under reduced pressure below 40° C. and the residue is distributed between ether and water. The ether layer is separated and washed twice with water, extracted three times with saturated sodium bicarbonate solution and washed three times with water. After drying over anhydrous magnesium sulfate and evaporating the solvent under reduced pressure on the steam bath, a yellow oily residue, which is a mixture of 3-benzyl-6-trifluoromethylphthalide and dibenzyl, is obtained.

The residue is dissolved in 50 ml. of absolute ethanol and treated with 7.0 ml. of 1.29 N ethanolic sodium hydroxide solution. The solution is hydrogenated at 70° C. and 45 p.s.i with 2 g. of 10% palladium on carbon catalyst. After four hours, an additional 2 g. of catalyst is added and the hydrogenation is continued for 16 hours. The catalyst is separated by filtration, the solution is acidified with 5 ml. of 7.1 N ethanolic hydrogen chloride solution and evaporated under reduced pressure on the steam bath. The residue is distributed between 40 ml. of ether and 40 ml. of water, the aqueous layer is separated and again extracted with 40 ml. of ether. The combined ether extracts are extracted with three 40 ml. portions of 5% sodium hydroxide solution and washed four times with water. The combined alkaline extracts and washings are acidified with 3 N hydrochloric acid and extracted with three portions of methylene chloride. After washing with water and drying over magnesium sulfate, the methylene chloride is evaporated under reduced pressure leaving a pale yellow solid residue weighing 1.27 g. The residue is combined with 0.37 g. of material from a previous preparation and sublimed at 115–120° C./0.3 mm. The product is a white solid weighing 1.03 g. and melting at 111–114° C. An analytical sample melts at 114.5–116° C. after recrystallization from hexane.

(G) 3 - trifluoromethyl-10,11-dihydro-5H-dibenzo[a,d] cyclohepten - 5 - one.—2-phenethyl-5-trifluoromethylbenzoic acid (1.74 g., 0.0059 mole) is dissolved in 25 ml. of trifluoroacetic anhydride and a stream of boron trifluoride is passed in for fifteen minutes at 23–26° C. The mixture, containing a yellow precipitate, is stirred at room temperature for approximately fifteen hours and then poured into 50 ml. of ice and water. The product is extracted with three 40 ml. portions of ether, the combined extracts are washed twice with 5% sodium hydroxide solution, twice with saturated sodium bicarbonate solution, three times with water and dried over magnesium sulfate. The ether is evaporated under reduced pressure. The product is a yellow oil weighing 1.68 g.

EXAMPLE 3

5-(2,3-epoxypropylidene)-5H-dibenzo[a,d]-10,11-dihydrocycloheptene

A solution of 500 mg. of 5-allylidene-5H-dibenzo[a,d]-10,11-dihydrocycloheptene is dissolved in 25 cc. of benzene and the resulting solution is reacted with 1.1 mole equivalents of perbenzoic acid. The course of the reaction is followed by the disappearance of the diene absorption in the U.V band at 270 mµ and the appearance of absorption at 240 mµ. At the conclusion of the epoxidation, excess perbenzoic acid is removed by washing the benzene solution of the reaction product with 5% aqueous sodium carbonate solution. Evaporation of the benzene under reduced pressure yields 5-(2,3-epoxypropylidene)-5H-dibenzo[a,d]dihydrocycloheptene as a nearly colorless oil. Physical constants of the desired product include a λ max. at 240 mµ with $E^{1\%}_{1\,cm.}$ 510

EXAMPLE 4

5-(3-oxapropylidene)-5H-dibenzo[a,d]-10,11-dihydrocycloheptene 400 mg. of 5-(2,3-epoxypropylidene)-5H-dibenzo[a,d]-10,11-dihydrocycloheptene is dissolved in 50 cc. of benzene and to the resulting solution there is added 4 cc. of boron trifluoride etherate. The reaction mixture is then allowed to stand for two hours. At the end of this period, the boron trifluoride etherate is removed with a water wash and the dried benzene solution evaporated to yield crude 5-(3-oxapropylidene)-5H-dibenzo[a,d]-10,11-dihydrocycloheptene.

EXAMPLE 5

5-(3-dimethylaminopropylidene)-5H-dibenzo[a,d]-10,11-dihydrocycloheptene

A mixture containing 200 mg. of 5-(3-oxapropylidene)-5H-dibenzo[a,d]-10,11-dihydrocycloheptene, 80 cc. of benzene, 4 mole equivalents of dimethylamine and 10 grams of magnesium sulfate is refluxed for approximately 10 hours at 80° C. in an appropriate container set up with a water separator apparatus (Dean-Stark apparatus). After the reaction period the mixture is filtered to yield a benzene filtrate containing the 5-(dieneamine) derivative. The benzene solution is then transferred to a hydrogenation bomb along with 200 mg. of 10% palladium on carbon and the solution is hydrogenated at room temperature by introducing a molar amount of hydorgen into the solution. When the uptake of hydrogen is complete, the 5 - (3-oxapropylidene)-5H-dibenzo[a,d]-10,11-dihydrocycloheptene is isolated by filtering off the catalyst and concentrating the solution under reduced perssure to an oil. The desired product can also be isolated as its hydrochloride salt by dissolving the oil obtained above in ethyl ether and passing dry hydrogen chloride gas through the solution.

Alternatively, 5-(3-dimethylaminopropylidene)-5H-dibenzo[a,d]-10,11-dihydrocycloheptene can be prepared as follows: 200 mg. of crude 5-(3-oxapropylidene)-5H-dibenzo[a,d]-10,11-dihydrocycloheptene as prepared in Example 4 is dissolved in 10 cc. of a 6% solution of dimethylamine in ethyl alcohol. The resulting solution is then hydrogenated at room temperature, and at atmospheric pressure in the presence of 200 mg. of Raney nickel catalyst in an appropriate hydrogenation bomb by the introduction of a molar amount of hydrogen into the solution. When the hydrogen uptake is complete, the 5-(3-dimethylaminopropylidene) - 5H-dibenzo[a,d]-10,11-dihydrocycloheptene formed is isolated by filtering off the catalyst and evaporating the filtrate under pressure to an oil. Similarly, as described previously, the desired product can be isolated as the hydrochloride salt by dissolving the resulting oil in ethyl ether and passing dry hydrogen chloride gas through the solution.

EXAMPLE 6

5-(3-methylaminopropylidene)-5H-dibenzo[a,d]-10,11-dihydrocycloheptene

Following the procedure of Example 5 and using an equivalent amount of monomethylamine in place of dimethylamine, there is produced 5-(3-methylaminopropylidene)-5H-dibenzo[a,d]-10,11-dihydrocycloheptene.

Similarly, by following the procedures shown in Examples 3–6 a corresponding amount of the enumerated end products shown below can be obtained if the starting material of Example 3 is replaced by an equivalent amount of the starting material shown below.

| Starting material | End product |
| --- | --- |
| (1) 5-allylidene-3-methylsulfonyl-5H-dibenzo-[a,d]-10,11-dihydrocycloheptene. | 5-(3-dimethylamino-propylidene)-3-methylsulfonyl-5H-dibenzo-[a,d]-10,11-dihydrocycloheptene. |
| (2) 5-allylidene-3-trifluoromethyl-5H-dibenzo[a,d]-10,11-dihydrocycloheptene. | 5-(3-dimethylaminopropylidene)-3-trifluoromethyl-5H-dibenzo-[a,d]-10,11-dihydrocycloheptene. |
| (3) 5-allylidene-3-methylsulfonyl-5H-dibenzo[a,d]-10,11-dihydrocycloheptene. | 5-(3-methylaminopropylidene)-3-methylsulfonyl-5H-dibenzo-[a,d]-10,11-dihydrocycloheptene. |
| (4) 5-allylidene-3-trifluoromethyl-5H-dibenzo[a,d]-10,11-dihydrocycloheptene. | 5-(3-methylaminopropylidene)-3-trifluoromethyl-5H-dibenzo-[a,d]-10,11-dihydrocycloheptene. |

What is claimed is:
1. A method for the preparation of compounds of the following formula:

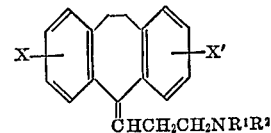

wherein $R^1$ and $R^2$ are selected from the group consisting of hydrogen and methyl and X is hydrogen and X' is selected from the group consisting of hydrogen trifluoromethyl and loweralkylsulfonyl, not exceeding room temperature which comprises:

(1) reacting a compound of the formula:

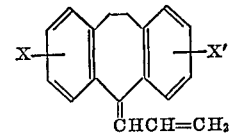

wherein X and X' are as explained above, with a peracid to form a compound of the formula:

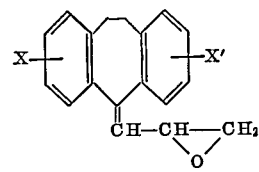

wherein X and X' are as explained above:

(2) rearranging the product of Step No. 1 in the presence of an acid catalyst selected from the group consisting of borontrifluoride, zinc chloride and halogen acids to form a compound of the formula:

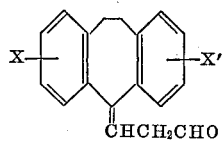
ĊHCH₂CHO wherein X and X' are as explained above; and
(3) reductively aminating the product of Step No. 2 with a compound selected from the group consisting of monomethylamine and dimethylamine and with hydrogen in the presence of a hydrogenation catalyst selected from the group consisting of palladium and Raney nickel.

2. The process of claim 1 wherein the reductive amination is performed by reacting the product of Step No. 2 with a compound selected from the group consisting of monomethylamine and dimethylamine and then hydrogenating the resulting product.

3. A method for the preparation of compounds of the following formula:

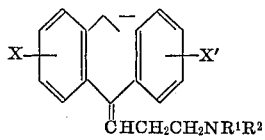
ĊHCH₂CH₂NR¹R² wherein R¹ and R² are selected from the group consisting of hydrogen and methyl; and X is hydrogen and X' is selected from the group consisting of hydrogen, trifluoromethyl and loweralkylsulfonyl, not exceeding room temperature which comprises (1) reacting a compound of the formula:

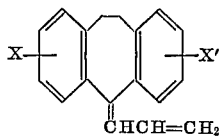
ĊHCH=CH₂ wherein X and X' are as explained above with a peracid selected from the group consisting of perbenzoic acid, peracetic acid, peroxytrifluoroacetic acid and perphthalic acid to form a compound of the formula:

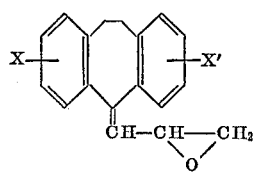
ĊH—CH——CH₂
    \\O/ wherein X and X' are as explained above;
(2) rearranging the product of Step No. 1 in the presence of an acid catalyst selected from the group consisting of boron trifluoride etherate, zinc chloride and halogen acids to form a compound of the formula:

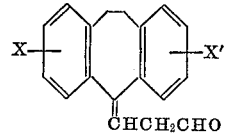
ĊHCH₂CHO wherein X and X' are as explained above; and
(3) reacting the product of Step No. 2 with a compound selected from the group consisting of monomethylamine and dimethylamine to produce the corresponding dieneamine derivative and reacting the dieneamine formed with hydrogen in the presence of a hydrogenation catalyst.

4. A method for preparing 5-(3-dimethylaminopropylidene)5H-dibenzo[a,d] - 10,11 - dihydrocycloheptene at a temperature not exceeding room temperature which comprises the steps of:
(1) reacting 5-allylidene-5H-dibenzo[a,d]-10,11-dihydrocycloheptene with perbenzoic acid to produce the corresponding 5 - (2,3 - epoxypropylidene)-5H-dibenzo[a,d]-10,11-dihydrocycloheptene;
(2) rearranging the product of Step No. 1 in the presence of boron trifluoride etherate to form 5-(3-oxapropylidene) - 5H-dibenzo[a,d]-10,11-dihydrocycloheptene; and
(3) reacting the product of Step No. 2 with dimethylamine to produce the corresponding dieneamine and thereafter reacting the dieneamine formed with hydrogen in the presence of Raney nickel to produce 5 - (3 - dimethylaminopropylidene) - 5H - dibenzo [a,d]-10,11-dihydrocycloheptene.

5. A method for preparing 5-(3-methylaminopropylidene)5H-dibenzo[a,d] - 10,11 - dihydrocycloheptene at a temperature not exceeding room temperature which comprises the steps of:
(1) reacting 5-allylidene-5H-dibenzo[a,d]-10,11-dihydrocycloheptene with perbenzoic acid to produce the corresponding 5 - (2,3 - epoxypropylidene)-5H-dibenzo[a,d]-10,11-dihydrocycloheptene;
(2) rearranging the product of Step No. 1 in the presence of boron trifluoride etherate to form 5-(3-oxapropylidene) - 5H-dibenzo[a,d]-10,11-dihydrocycloheptene; and
(3) reacting the product of Step No. 2 with methylamine to produce the corresponding dieneamine and thereafter reacting the dieneamine formed with hydrogen in the presence of Raney nickel to produce 5 - (3 - methylaminopropylidene) - 5H - dibenzo [a,d]-10,11-dihydrocycloheptene.

References Cited

UNITED STATES PATENTS 3,256,332  6/1966  Lassen _____ 260—570.8
3,359,263  12/1967  Stelt _____ 260—570.8 XR

OTHER REFERENCES

Wagner et al.: "Synthetic Organic Chemistry," pp. 254–55 and 296 (1953).

ROBERT V. HINES, Primary Examiner.

U.S. Cl. X.R.

167—65; 260—141, 343.3, 348.5, 438.1, 515, 544, 546, 566, 580, 590, 599, 607, 618, 645, 650, 667, 668, 669, 688, 689